(12) United States Patent  (10) Patent No.: US 9,137,449 B2
Nagata et al.  (45) Date of Patent: Sep. 15, 2015

(54) LUMINANCE ESTIMATION MODEL GENERATION DEVICE, IMAGE SENSOR DEVICE, AND COMPUTER PROGRAM PRODUCT

(71) Applicant: Kabushiki Kaisha Toshiba, Tokyo (JP)

(72) Inventors: Kazumi Nagata, Tokyo (JP); Takaaki Enohara, Tokyo (JP); Kenji Baba, Tokyo (JP); Shuhei Noda, Tokyo (JP); Nobutaka Nishimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/820,690

(22) PCT Filed: Jan. 8, 2013

(86) PCT No.: PCT/JP2013/050126
§ 371 (c)(1),
(2) Date: Mar. 4, 2013

(87) PCT Pub. No.: WO2013/136822
PCT Pub. Date: Sep. 19, 2013

(65) Prior Publication Data
US 2015/0015775 A1    Jan. 15, 2015

(30) Foreign Application Priority Data
Mar. 12, 2012  (JP) ................................ 2012-054910

(51) Int. Cl.
*H04N 5/235* (2006.01)
*H04N 5/225* (2006.01)
*H05B 37/02* (2006.01)

(52) U.S. Cl.
CPC ........... *H04N 5/2351* (2013.01); *H04N 5/2256* (2013.01); *H04N 5/2354* (2013.01); *H05B 37/0227* (2013.01)

(58) Field of Classification Search
CPC . H04N 5/2354; H04N 5/2256; H04N 5/2352; H04N 5/222; H04N 5/225
USPC .......................................... 348/370, 362, 371
See application file for complete search history.

(56) References Cited

U.S. PATENT DOCUMENTS 7,256,833 B2 *    8/2007  Shaw et al. ................... 348/370
2003/0218688 A1 *  11/2003  Shaw et al. ................... 348/370

(Continued)

FOREIGN PATENT DOCUMENTS

JP    2001-250696    9/2001
JP    2001-281054    10/2001

(Continued)

OTHER PUBLICATIONS

International Search Report and Written Opinion issued Apr. 2, 2013 in PCT/JP2013/050126 (with English translation of Category of Cited Documents).

*Primary Examiner* — Nicholas Giles
*Assistant Examiner* — Abdelaaziz Tissire
(74) *Attorney, Agent, or Firm* — Oblon, McClelland, Maier & Neustadt, L.L.P.

(57) ABSTRACT

There are provided a retaining unit that retains a basic model indicating a plurality of relations for a plurality of subject conditions between a plurality of illuminances and a plurality of luminance of a plurality of captured images, which are obtained when a subject is imaged by changing an illuminance condition under the subject conditions; a reference image acquiring unit that acquires a captured image captured in a target space for illuminance estimation as a reference image; a reference illuminance acquiring unit that acquires illuminance of the target space at a time of imaging the reference image as reference illuminance; and an illuminance estimation model generating unit that generates an illuminance estimation model indicating a relation between illuminance and luminance in the target space from a data value indicated as a pair of the reference illuminance and luminance of the reference image based on the basic model.

11 Claims, 12 Drawing Sheets

(56) References Cited

U.S. PATENT DOCUMENTS

| | | | |
|---|---|---|---|
| 2007/0153102 A1* | 7/2007 | Suzuki et al. | 348/240.99 |
| 2010/0165144 A1* | 7/2010 | Lee | 348/229.1 |
| 2010/0165180 A1* | 7/2010 | Park et al. | 348/371 |
| 2010/0271503 A1* | 10/2010 | Safaee-Rad et al. | 348/223.1 |

FOREIGN PATENT DOCUMENTS

| | | |
|---|---|---|
| JP | 2002-110371 | 4/2002 |
| JP | 2011-81982 | 4/2011 |
| JP | 2012-28015 | 2/2012 |

\* cited by examiner

| SENSOR IDENTIFIER | LIGHTING IDENTIFIER |
|---|---|
| SENSOR 01 | LIGHTING 01 |
| | LIGHTING 02 |
| | LIGHTING 03 |
| SENSOR 02 | LIGHTING 04 |
| | LIGHTING 05 |
| | LIGHTING 06 |

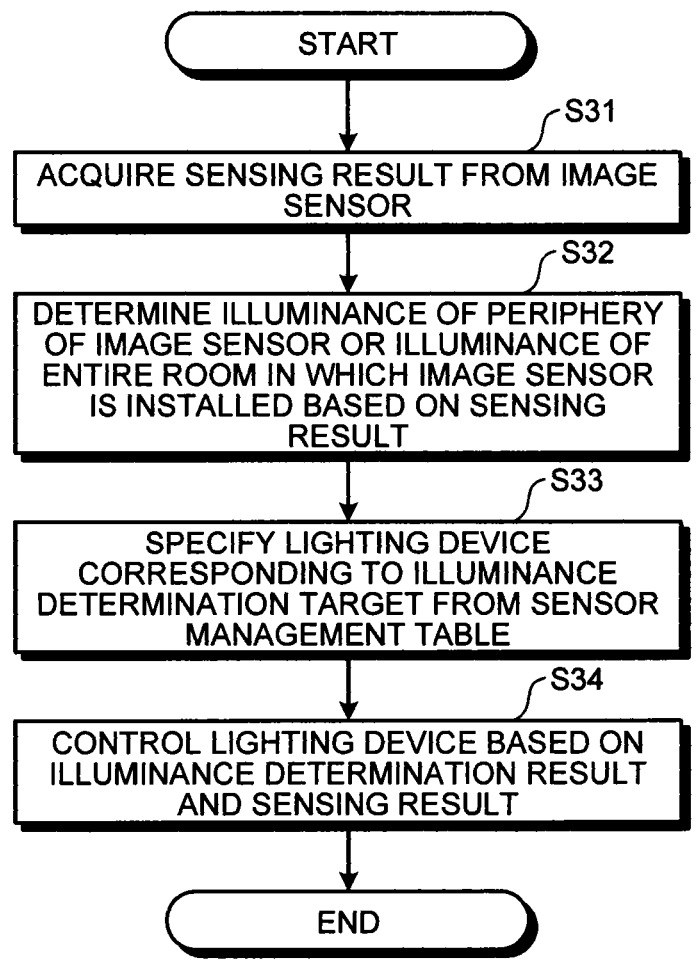

LUMINANCE ESTIMATION MODEL GENERATION DEVICE, IMAGE SENSOR DEVICE, AND COMPUTER PROGRAM PRODUCT

CROSS REFERENCE TO THE RELATED APPLICATIONS

This application is a national stage application of International Application No. PCT/JP2013/050126, filed Jan. 8, 2013, which designates the United States, incorporated herein by reference, and which claims the benefit of priority from Japanese Patent Application No. 2012-054910, filed on Mar. 12, 2012, the entire contents of which are incorporated herein by reference.

FIELD

Embodiments relate to an information processing device, an image sensor device, and a program.

ART

Conventionally, control devices that efficiently perform light modulation control in order to save energy have been requested. For example, when illuminance sensors (illuminance system) installed in offices or the like detect that illuminance is less than a threshold value, the control devices perform control to turn off lighting devices located at corresponding positions and keep the illuminance having a constant value. In the past, technologies for performing lighting control using images (captured images) captured by cameras instead of the above-described illuminance sensors have been suggested.

However, there may be various detection areas in which image sensors are installed. Therefore, it is desirable to provide a technology capable of detecting indoor brightness with higher accuracy, irrespective of setting places of the detection areas. Further, when illuminance estimation is performed using captured images, it is necessary to adjust setting so that an appropriate sensing result can be obtained from the captured images. However, since the adjustment work becomes complicated with an increase in the number of cameras, it is desirable to provide a technology capable of performing adjustment more efficiently.

BRIEF DESCRIPTION OF DRAWINGS

FIG. 13 is a diagram illustrating an example of a data structure of a sensor management table illustrated in FIG. 12.

FIG. 14 is a flowchart illustrating an example of a lighting control process according to the third embodiment.

DESCRIPTION OF EMBODIMENTS

According to an embodiment, an information processing device comprises: a retaining unit that retains a basic model indicating a plurality of relations for a plurality of subject conditions between a plurality of illuminances and a plurality of luminance of a plurality of captured images, which are obtained when a subject is imaged by changing an illuminance condition under the subject conditions; a reference image acquiring unit that acquires a captured image captured in a target space for illuminance estimation as a reference image; a reference illuminance acquiring unit that acquires illuminance of the target space at a time of imaging the reference image as reference illuminance; and an illuminance estimation model generating unit that generates an illuminance estimation model indicating a relation between illuminance and luminance in the target space from a data value indicated as a pair of the reference illuminance and luminance of the reference image based on the basic model.

Hereinafter, an information processing device, an image sensor device, and a program according to embodiments of the invention will be described in detail with reference to the appended drawings.

[First Embodiment]

In a first embodiment, an example will be described in which an information processing device and a program according to the invention are applied to an illuminance estimation model generation device that generates an illuminance estimation model to be described below.

Figure 1:
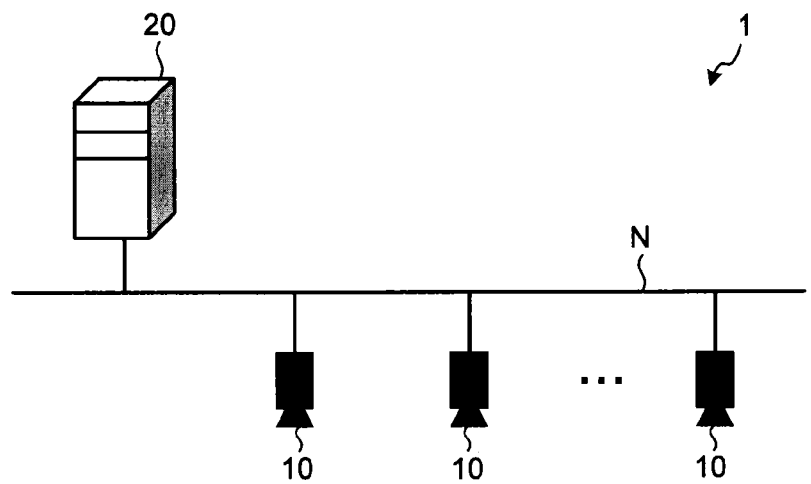
FIG. 1 is a diagram illustrating an example of the configuration of an illuminance estimation model setting system according to a first embodiment.

FIG. 1 is a diagram illustrating an example of the configuration of an illuminance estimation model setting system 1 according to the first embodiment. As illustrated in the drawing, the illuminance estimation model setting system 1 includes image sensors 10 and an illuminance estimation model generation device 20. Here, the image sensors 10 and the illuminance estimation model generation device 20 are detachably connected to a line N, and thus communicate with each other via the line N. The number of image sensors 10 connected to the line N is not particularly limited. Hereinafter, each device of the illuminance estimation model setting system 1 will be described.

The image sensor 10 includes an image sensor such as a CCD (Charge Coupled Device) or a CMOS (Complementary Metal Oxide Semiconductor) and outputs illuminance or the like derived based on an image or a video (hereinafter, referred to as a captured image) obtained by imaging as a sensing result. For example, as illustrated in FIG. 2, the image sensor 10 is installed on a ceiling of a building and performs imaging in a floor direction (directly lower direction).

Figure 2:
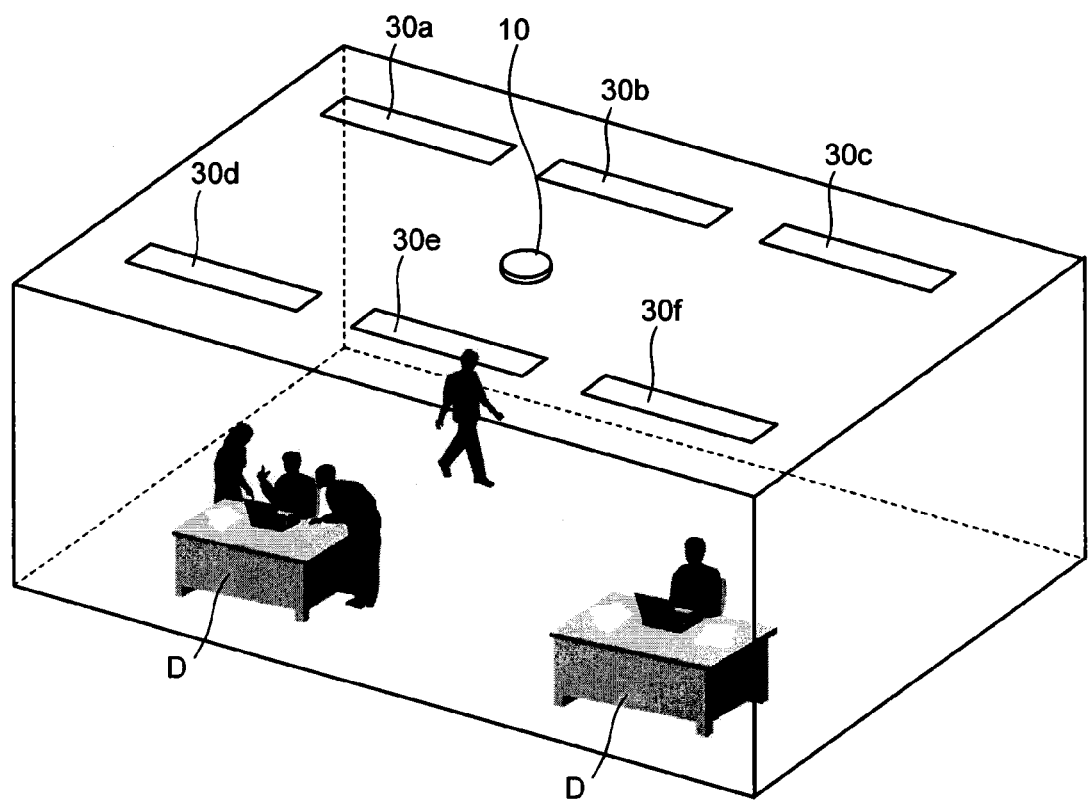
FIG. 2 is a diagram illustrating an installation example of an image sensor illustrated in FIG. 1.

Here, FIG. 2 is a diagram illustrating an installation example of the image sensor 10. In the drawing, the image sensor 10 is installed in a ceiling. Lighting devices 30 (30a to 30f) that illuminate an office are installed on the ceiling. FIG. 2 illustrates an example in which two desks D are arranged side by side in the office, but the indoor layout is not limited to this example.

Figure 3:
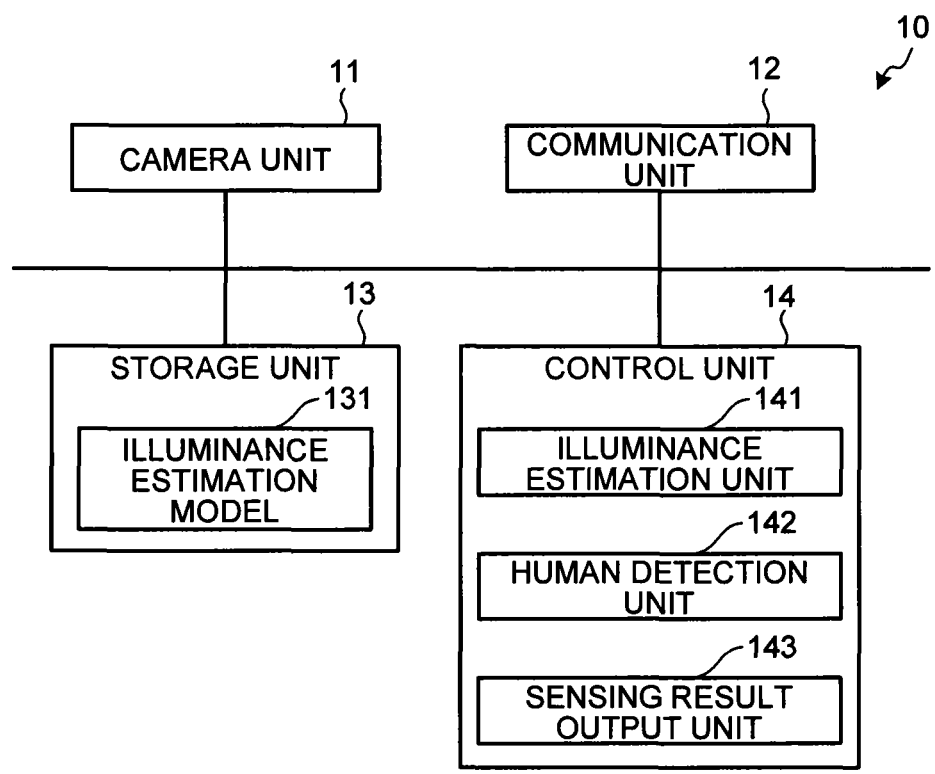
FIG. 3 is a diagram schematically illustrating an example of the configuration of the image sensor illustrated in FIG. 1.

FIG. 3 is a diagram schematically illustrating an example of the configuration of the image sensor 10. As illustrated in the drawing, the image sensor 10 includes a camera unit 11, a communication unit 12, a storage unit 13, and a control unit 14.

The camera unit 11 is an image sensor such as a CCD (Charge Coupled Device) or a CMOS (Complementary Metal Oxide Semiconductor) and outputs a photographed captured image to the control unit 14. The communication unit 12 is a communication interface which is detachably connected to the line N, and transmits and receives various kinds of information to and from an external device (the illuminance estimation model generation device 20 or the like) via the line N.

The storage unit 13 stores various programs or setting information relevant to the control of the image sensor 10. An example of the setting information stored by the storage unit 13 includes an illuminance estimation model 131 determined by a relation between luminance obtained from the captured image and illuminance estimated from the luminance. The illuminance estimation model 131 is setting information set by the illuminance estimation model generation device 20. An illuminance estimation unit 141 to be described below performs illuminance estimation from the captured image using the illuminance estimation model 131. The illuminance estimation model 131 will be described in detail below.

The control unit 14 has a computer configuration of a CPU (Central Processing Unit), a ROM (Read Only Memory), a RAM (Random Access Memory), and the like (none of which are illustrated) and generally controls a process of the image sensor 10 in cooperation with a program stored in the ROM or the storage unit 13. Further, the control unit 14 includes the illuminance estimation unit 141, a human detection unit 142, and a sensing result output unit 143 as functional units in cooperation with a program stored in the ROM or the storage unit 13.

The illuminance estimation unit 141 estimates the illuminance of an area which is a subject from the captured image photographed by the camera unit 11 based on the illuminance estimation model 131 stored in the storage unit 13. Specifically, the illuminance estimation unit 141 acquires luminance from the captured image and derives (estimates) illuminance corresponding to the luminance based on the illuminance estimation model 131.

Here, the luminance is acquired from the captured image by a pixel level, but an area to be acquired is not particularly limited. For example, an average value or the like of the luminances of pixels constituting the captured image may be acquired as the luminance of the captured image. Further, an average value of the luminances of arbitrary areas in the captured image may be acquired as the luminance of the captured image.

Furthermore, the luminance may be acquired for each of the pixels constituting the captured image or each of a plurality of division areas divided from the captured image. For example, when the illuminance estimation model 131 corresponding to the disposition position of each pixel or each division area is set, the illuminance is derived for each pixel or each division area using the corresponding illuminance estimation model 131. The illuminance derived from each pixel or each division area may be output together with the corresponding disposition position or an average value or the like of the illuminances of the pixels or the division areas may be output.

The human detection unit 142 detects presence/absence of people, the behavior contents of people, the amount of activation, the number of people, or the like in an area which is a subject by analyzing the captured image photographed by the camera unit 11. A method of detecting the presence/absence of people from the captured image is realized by a known technology.

The sensing result output unit 143 outputs the illuminance estimated by the illuminance estimation unit 141 and the detection result obtained by the human detection unit 142 as the sensing result of the subject device to an external device via the communication unit 12 or stores the illuminance and the detection result in the storage unit 13. The illuminance output as the sensing result may be an unchanged value output from the illuminance estimation unit 141 or may be a value divided step by step (level) according to the degree of illuminance.

Figure 4:
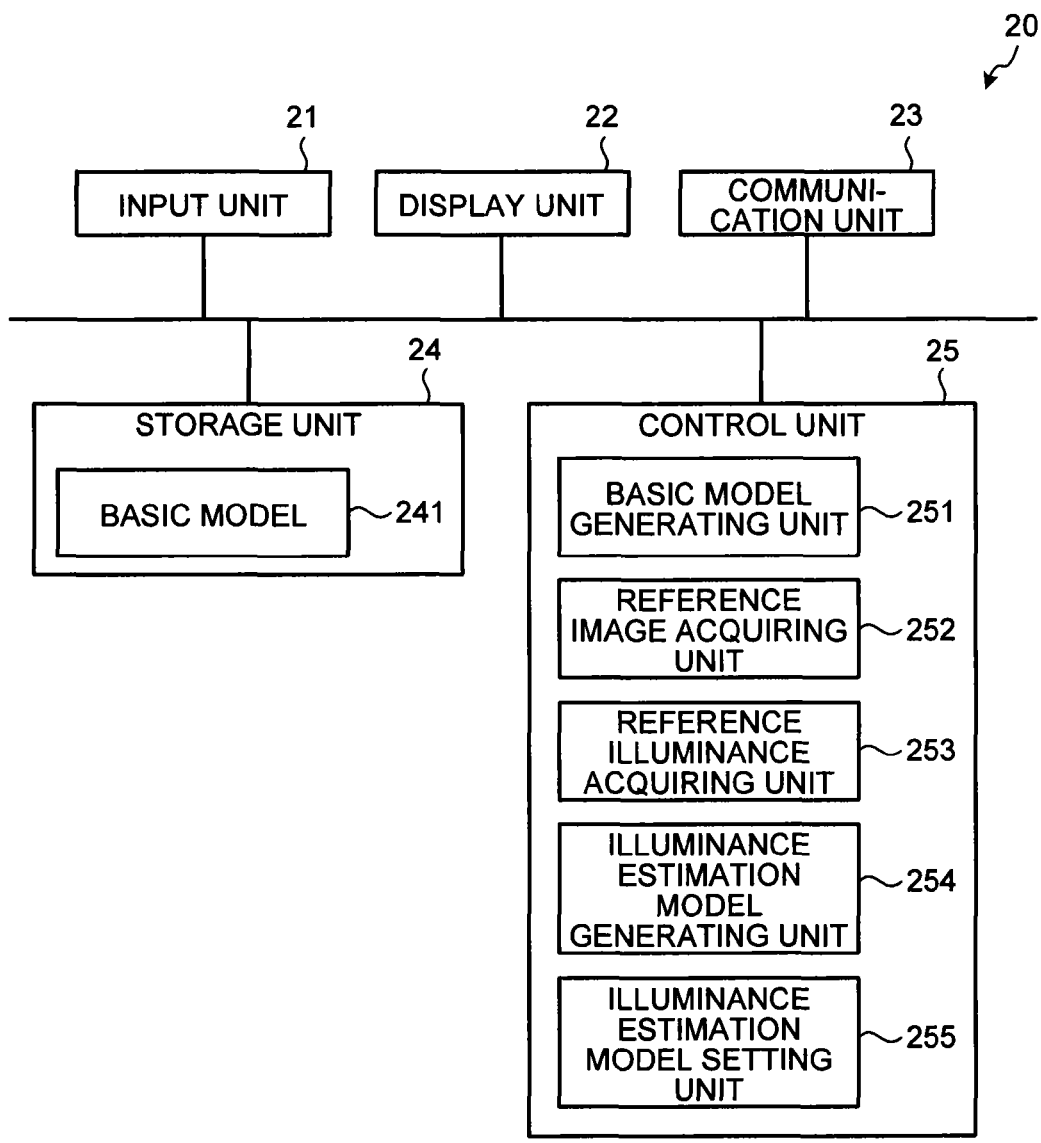
FIG. 4 is a diagram schematically illustrating an example of the configuration of the illuminance estimation model generation device illustrated in FIG. 1.

FIG. 4 is a diagram schematically illustrating an example of the configuration of the illuminance estimation model generation device 20. The illuminance estimation model generation device 20 is an information processing device such as a PC (Personal Computer) or a portable communication terminal. As illustrated in the drawing, the illuminance estimation model generation device 20 includes an input unit 21, a display unit 22, a communication unit 23, a storage unit 24, and a control unit 25.

The input unit 21 includes an input device such as a keyboard or a pointing device and outputs operation contents received from an operator of the illuminance estimation model generation device 20 to the control unit 25. The display unit 22 includes a display device such as a liquid crystal display panel and displays various kinds of information in response to an instruction from the control unit 25. The communication unit 23 is a communication interface which is detachably connected to the line N, and transmits and receives various kinds of information to and from an external device (the image sensor 10 or the like) via the line N.

The storage unit 24 is an auxiliary storage device such as an HDD or an SSD and stores various programs or setting information relevant to the control of the illuminance estimation model generation device 20. The setting information stored by the storage unit 24 includes a basic model 241 which is a basis of generation of the illuminance estimation model 131.

The basic model 241 is information generated based on captured images photographed under a plurality of subject conditions and imaging conditions at the time of the photographing and serves a basis of the generation of the illuminance estimation model 131. Here, examples of the subject conditions include a space which is a subject and a reflection ratio of an object. Examples of the imaging conditions include an illuminance condition indicating the illuminance of a subject space at the time of the photographing and a camera parameter of an imaging device (the image sensor 10 or the like) at the time of the photographing.

Specifically, the basic model 241 is generated through the following process. First, a model space is imaged by changing the illuminance conditions under each model space which has a different subject condition (reflection ratio) in which the color of a wall or a floor is black, white, or the like. Next, a pair of the illuminance under each illuminance condition obtained through the imaging and the luminance of the captured image photographed under the illuminance condition is generated as a data value for each subject condition. Then, the generated data values of the respective subject conditions are plotted on a coordinate plane and a regression expression approximating a distribution of the data values is generated as the basic model 241 for each subject condition.

Figure 5:
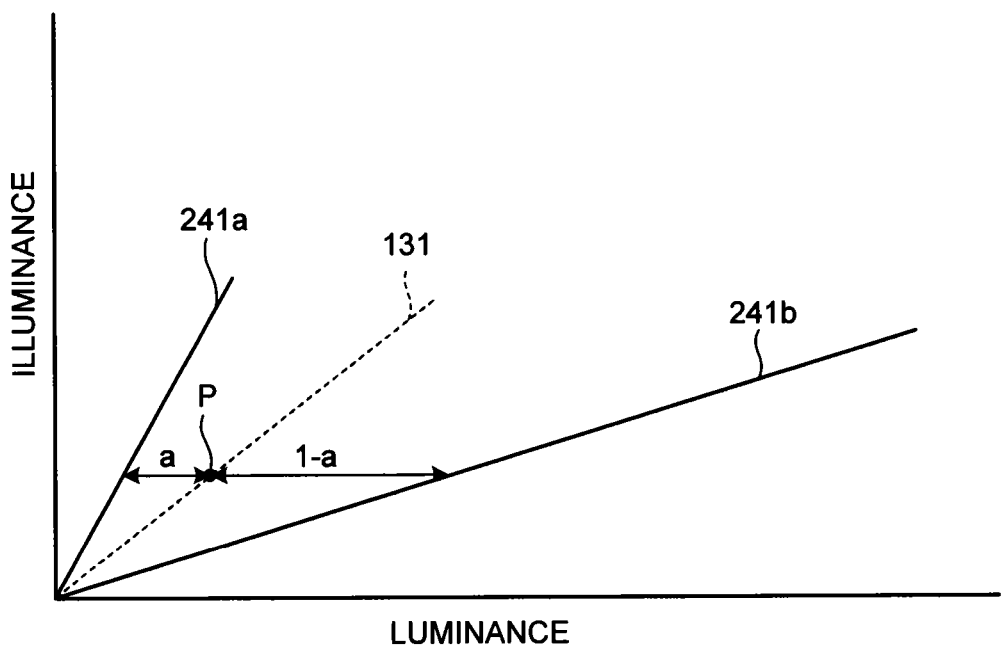
FIG. 5 is a diagram schematically illustrating examples of basic models illustrated in FIG. 4.

Here, FIG. 5 is a diagram schematically illustrating examples of the basic models 241 generated through the above-described process. In the drawing, the vertical axis represents the illuminance of a model space and the horizontal axis represents the luminance of a captured image. Graphs in the drawing correspond to the basic models 241. A basic model 241a is a regression expression of a pair of the illuminance and the luminance obtained from a model space with a reflection ratio lower than that of a basic model 241b (for example, the basic model 241a is a block model space and the basic model 241b is a white model space). Thus, the basic models 241 (241a and 241b) indicates relations between a plurality of illuminances and the luminances of the captured images, which are obtained when the model spaces are imaged changing the illuminance conditions under the plurality of subject conditions, for each subject condition.

The model space to be imaged may be a space in which the image sensor 10 is actually installed or may be a space different from this space. Further, as an imaging device imaging the model spaces, the image sensor 10 or an imaging device using the same kind of image sensor as the image sensor 10 is preferably used, but the invention is not limited thereto.

The luminance is acquired from the captured image by the pixel level, but the area to be acquired is not particularly limited. For example, an average value or the like of the luminances of the pixels constituting the captured image may be set as the luminance of the entire captured image. Further, the average value of the luminances of specific areas in the captured image may be set as the luminance of the entire captured image.

Furthermore, the luminance may be acquired for each of the pixels constituting the captured image or each of a plurality of division areas divided from the captured image. In this case, a pair of the illuminance and luminance may be acquired for each of the pixel or the division regions of which disposition positions are the same in the captured image, and the regression expression (the basic model 241) may be generated for each disposition position in the captured image. Further, when the basic model 241 is generated for each pixel or division area, the basic model 241 is retained in correspondence with the disposition position of the corresponding pixel or division area.

In the above-described example, the example in which the illuminance conditions are used among the imaging conditions has been described. However, when the camera parameters are included, the basic model 241 formed by three or more components may be generated by combining each condition at the time of changing the camera parameter (for example, a value relevant to exposure correction such as a shutter speed) with the pair of the subject condition and the illuminance condition described above.

Referring back to FIG. 4, the control unit 25 has a computer configuration of a CPU, a ROM, a RAM, and the like (none of which are illustrated) and generally controls a process of the illuminance estimation model generation device 20 in cooperation with a program stored in the ROM or the storage unit 24. Further, the control unit 25 includes a basic model generating unit 251, a reference image acquiring unit 252, a reference illuminance acquiring unit 253, an illuminance estimation model generating unit 254, and an illuminance estimation model setting unit 255 as functional units in cooperation with a program stored in the ROM or the storage unit 24.

The basic model generating unit 251 generates the above-described basic models 241 based on the captured images obtained when the model spaces are imaged changing the imaging conditions (illuminance conditions) under the plurality of subject conditions (a reflection ratio and the like), and then retains the basic models 241 in the storage unit 24. Further, when the basic models 241 are stored in advance in the storage unit 24, the basic model generating unit 251 is not necessary. Therefore, the basic model generating unit 251 may be excluded from the illuminance estimation model generation device 20.

The reference image acquiring unit 252 acquires the captured image photographed by the setting target sensor from the image sensor 10 (hereinafter, referred to as a setting target sensor), which is a setting target of the illuminance estimation model 131, as a reference image. For example, when the image sensor 10 illustrated in FIG. 2 is set as the setting target sensor, the reference image acquiring unit 252 acquires the captured image photographed by the image sensor 10 in the office as a reference image. Further, the peripheral environment state at the acquisition timing of the reference image or at the acquisition time is not particularly limited, but the reference image is preferably acquired under the environment condition serving as a reference of the illuminance estimation. Here, the environment condition serving as the reference of the illuminance estimation refers to, for example, a state in which all of the lighting lamps (for example, the lighting devices 30 illustrated in FIG. 2) of the indoor in which the image sensor 10 is installed are turned on or a state in which all of the lighting lamps are turned off at a predetermined clock (for example, 12 o'clock).

The reference illuminance acquiring unit 253 acquires, as reference illuminance, illuminance measured within an imaging range of the setting target sensor when the reference image is captured (acquired). Here, a method of acquiring the reference illuminance is not particularly limited. For example, the illuminance (reference illuminance) at the time of capturing the reference image may be acquired from an illuminance system installed within the imaging range of the setting target sensor via the communication unit 23 or the like. Further, the illuminance measured at the time of capturing the reference image may be separately stored and the stored illuminance may be acquired as the reference illuminance via the input unit 21 or the communication unit 23. Furthermore, when the environments of an imaging target are the same between the plurality of setting target sensors, one reference illuminance may be shared.

The measurement position of the illuminance within the imaging range of the setting target sensor is not particularly limited. For example, the illuminance may be measured at a representative position such as a position directly below the image sensor 10. Further, the illuminances may be measured at a plurality of positions within the imaging range and an average value or the like of the illuminances may be used.

The illuminance estimation model generating unit 254 generates the illuminance estimation model 131 for the setting target sensor based on the basic model 241 stored in the storage unit 24, the reference image acquired by the reference image acquiring unit 252, and the reference illuminance acquired by the reference illuminance acquiring unit 253.

Specifically, the illuminance estimation model generating unit 254 acquires the luminance (hereinafter, referred to as reference luminance) from the reference image and generates a reference data value by pairing the reference luminance and the corresponding reference illuminance. Further, the illuminance estimation model generating unit 254 generates an illuminance estimation model 131 indicating the relation of the illuminance and the luminance by performing linear interpolation on the generated reference data value based on the basic models 241.

For example, when the basic models 241 (241*a* and 241*b*) illustrated in FIG. 5 are used and the reference data value indicating the pair of the reference illuminance and the reference luminance is located at the position P (hereinafter, referred to as a reference data value P) in the drawing, the illuminance estimation model generating unit 254 calculates a difference ratio (corresponding to "a: 1−a" in the drawing) between the luminances of the basic models 241*a* and 241*b* in the illuminance of the reference data value P with reference to the luminance of the reference data value P. The illuminance estimation model generating unit 254 generates the illuminance estimation model 131 illustrated in FIG. 5 by performing linear interpolation on the reference data value P between the basic models 241*a* and 241*b* while maintaining the calculated difference ratio.

Thus, the illuminance estimation model generation device 20 generates the illuminance estimation model 131 customized for each setting target sensor by changing a weight through the linear interpolation using the basic models 241 based on the reference data value obtained for each setting target sensor (image sensor 10). Further, since the generated illuminance estimation model 131 is proper for the installation environment (imaging environment) of the image sensor 10, the accuracy of the illuminance estimation in the image sensor 10 can be improved by setting the illuminance estimation model 131 in the corresponding image sensor 10.

As described above, the example has been described in which the illuminance estimation model 131 is generated from one reference data value (the reference illuminance and the reference luminance), but the invention is not limited thereto. For example, a plurality of reference data values may be generated by acquiring the reference illuminances and the reference luminances at different periods of time (daytime, nighttime, and the like) and the illuminance estimation model 131 may be generated based on the reference data values and the basic models 241. Further, when three or more basic models 241 with different subject conditions (reflection ratios) are present, the illuminance estimation model 131 customized for the setting target sensor can be generated by generating the illuminance estimation model 131 using two basic models 241 including luminance of the reference data value under the same illuminance condition.

When the basic model 241 is present for each of the pixels or the division areas constituting the captured image, the luminance is acquired from each of the corresponding pixels or the division regions in the reference image and the illuminance estimation model 131 is generated using the basic model 241 corresponding to the disposition position of each of the pixels or the division areas. Further, when the illuminance estimation model generating unit 254 generates the illuminance estimation model 131 for each of the pixels or the division areas, each illuminance estimation model 131 is generated by causing the illuminance estimation model 131 to correspond to the disposition position of the pixel or the division area to which the illuminance estimation model 131 is applied.

Referring back to FIG. 4, the illuminance estimation model setting unit 255 sets the illuminance estimation model 131 in the setting target sensor by transmitting the illuminance estimation model 131 generated by the illuminance estimation model generating unit 254 to the setting target sensor via the communication unit 23 and storing the illuminance estimation model 131 in the storage unit 13 of the setting target sensor. When the disposition position to which the illuminance estimation model 131 is applied can correspond to the illuminance estimation model 131, the illuminance estimation model setting unit 255 sets each generated illuminance estimation model 131 in the setting target sensor by transmitting each illuminance estimation model 131 to the setting target sensor together with information indicating the disposition position to which the illuminance estimation model 131 is applied and storing each illuminance estimation model 131 in the storage unit 13.

Figure 6:
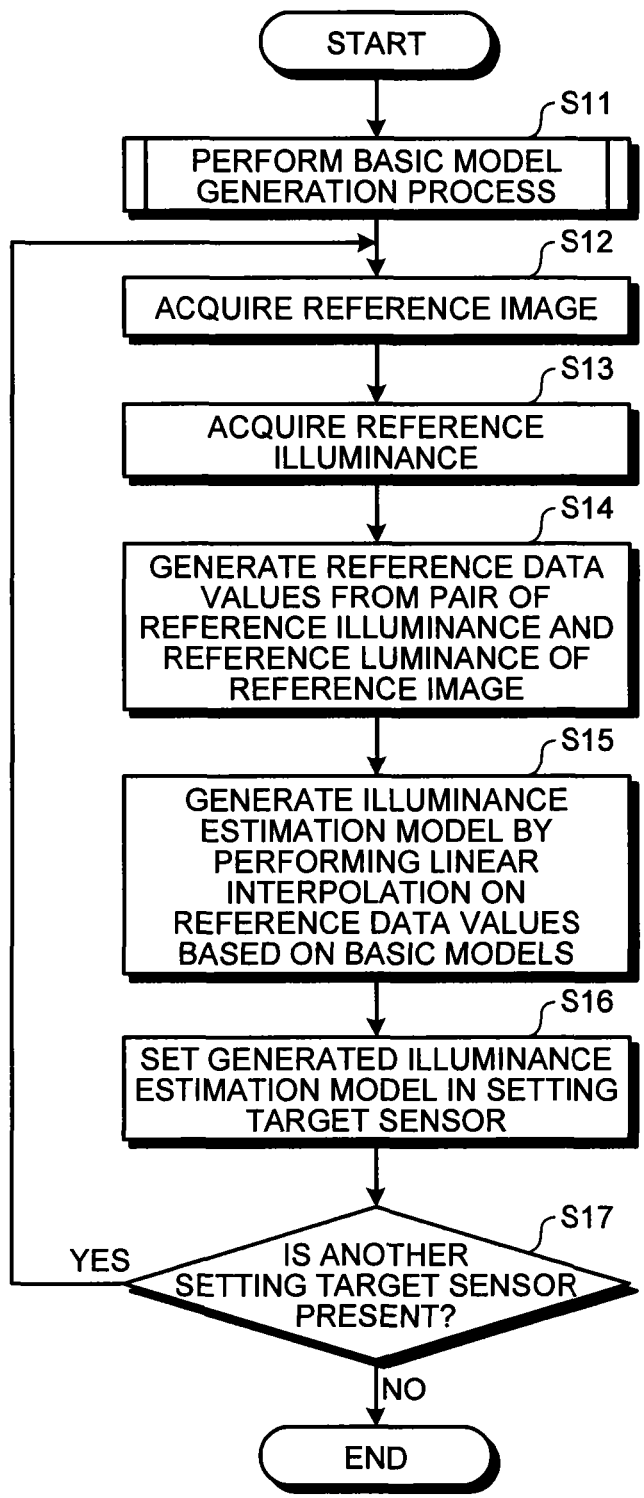
FIG. 6 is a flowchart illustrating an example of an illuminance estimation model generation process according to the first embodiment.

Hereinafter, an illuminance estimation model generation process performed by the above-described illuminance estimation model generation device 20 will be described. FIG. 6 is a flowchart illustrating an example of the illuminance estimation model generation process. As the supposition of this process, the captured images photographed by changing the illuminance conditions are captured in advance under the plurality of subject conditions (reflection ratio) and the basic model generating unit 251 generates the basic models 241 based on such data.

First, in step S11, the basic model generating unit 251 performs the basic model generation process of generating the basic models 241. Hereinafter, the basic model generation process will be described with reference to FIG. 7.

Figure 7:
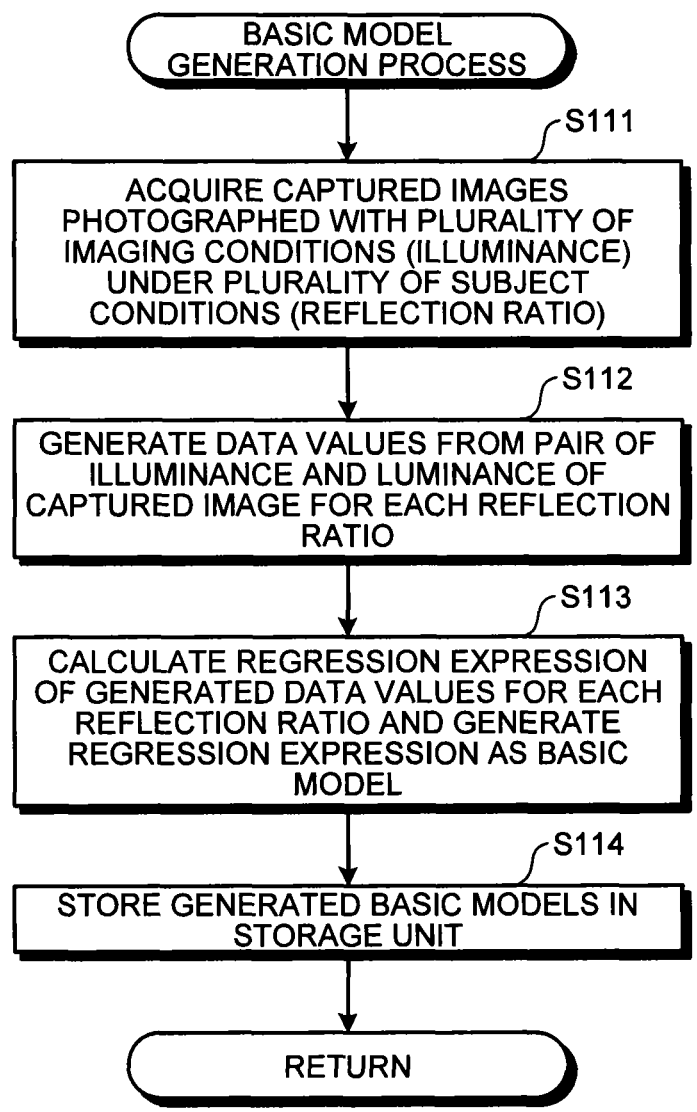
FIG. 7 is a flowchart illustrating an example of a basic model generation process illustrated in FIG. 6.

FIG. 7 is a flowchart illustrating an example of the basic model generation process. First, the basic model generating unit 251 acquires the captured images photographed by changing the illuminance conditions under the plurality of subject conditions (reflection ratio) (step S111). Subsequently, the basic model generating unit 251 generates the pair of the illuminance under each illuminance condition and the luminance of the captured image photographed under this illuminance condition as data values for each subject condition (reflection ratio) (step S112).

Next, when the data values of each subject condition generated in step S112 are plotted on a coordinate plane, the basic model generating unit 251 calculates the regression expression approximating the distribution of the data values for each subject condition (reflection ratio) and generates the regression expression as the basic model 241 (step S113). Then, the basic model generating unit 251 stores the basic models 241 generated in step S113 in the storage unit 24 (step S114), and the process proceeds to step S12 of FIG. 6.

The basic models 241 generated in this way indicate a relation between the illuminance of a space under the subject conditions and the luminance of the captured image. Further, the basic models 241 applicable to various environments can be generated by setting a difference in the reflection ratio serving as the subject condition to be relatively large, such as white and black.

Referring back to FIG. 6, the reference image acquiring unit 252 acquires the captured image photographed by the setting target sensor as the reference image (step S12). Then, the reference illuminance acquiring unit 253 acquires the illuminance measured within the imaging range of the setting target sensor as the reference illuminance, when the reference image in step S12 is captured (acquired) (step S13).

Subsequently, the illuminance estimation model generating unit 254 generates the reference data values from the pair of the reference illuminance and the reference luminance acquired from the reference image (step S14). Next, the illuminance estimation model generating unit 254 generates the illuminance estimation model 131 by plotting the reference data values generated in step S14 on the coordinate plane of the basic models 241 stored in the storage unit 24 and performing the linear interpolation on the reference data values based on the basic models 241 (step S15).

Subsequently, the illuminance estimation model setting unit 255 sets the illuminance estimation model 131 in the setting target sensor by transmitting the illuminance estimation model 131 generated in step S15 to the setting target sensor and storing the illuminance estimation model 131 in the storage unit 13 of the setting target sensor (step S16).

In subsequent step S17, the control unit 25 determines whether another image sensor 10 as the setting target sensor is present (step S17). When it is determined that another image sensor 10 as the setting target sensor is present (Yes in step S17), the image sensor 10 is set as the setting target sensor and the process returns to step S12 again. Thus, the processes of steps S12 to S16 are performed on the new setting target sensor.

Conversely, when it is determined in step S17 that the other image sensor 10 as the setting target sensor is not present (No in step S17), this process ends.

In this process, the basic model generation process has been performed as a part of the illuminance estimation model generation process. However, the timing at which the basic model generation process is performed is not particularly limited. However, the basic model generation process may be performed at another timing as a process independent from the illuminance estimation model generation process.

In this embodiment, as described above, the illuminance estimation model 131 proper for the environment of the image sensor 10 can be generated by performing the linear interpolation on the reference data values under the installation environment of the image sensor 10 using the basic models 241, and then can be set in the corresponding image sensor 10. Thus, the accuracy of the illuminance estimation in the image sensor 10 can be improved. Further, since the illuminance estimation model 131 can be set in each image sensor 10 easily and efficiently, convenience relevant to adjustment of the image sensor 10 can be improved.

The above-described first embodiment has been suggested as an example, and thus the scope of the invention is not intended as limiting. The above-described first embodiment may be achieved in various other ways, and omissions, substitutions, changes, additions, or the like may be variously made within the scope of the invention without departing from the gist of the invention. Further, the above-described embodiment or the modifications are included in the scope or the gist of the invention and are included in the equivalent scope of the invention described in the claims.

For example, in the above-described embodiment, the turn-on/turn-off of the lighting lamps of the indoor in which the image sensor 10 is installed is not particularly limited. However, for example, in the illuminance estimation model generation device 20, the reference image acquiring unit 252 or the reference illuminance acquiring unit 253 may be configured to control ON (turn-on)/OFF (turn-off) of the lighting lamps, output values, or the like. When this configuration is used, for example, the illuminance of the lighting devices 30 (30*a* to 30*f*) illustrated in FIG. 2 is controlled based on a predetermined turn-on/turn-off pattern and the illuminance estimation model 131 is generated based on the reference image and the illuminance obtained under the lighting lamps.

Figure 8:
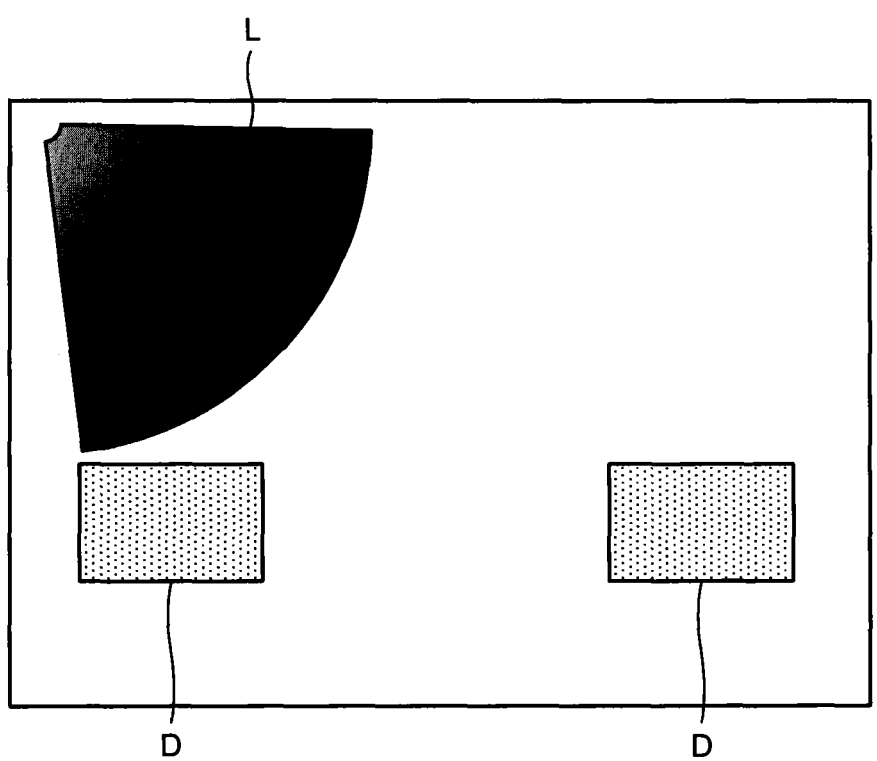
FIG. 8 is a diagram schematically illustrating an example of a captured image by the image sensor illustrated in FIG. 2.

Here, when the lighting device 30*a* is turned on among the lighting devices 30 illustrated in FIG. 2 and the other lighting devices 30*b* to 30*f* are turned off, the image sensor 10 acquires a captured image in which the periphery of the lighting device 30*a* is brightly lighted, as illustrated in FIG. 8. In this case, the illuminance estimation model generating unit 254 specifies an area (illuminated area) illuminated by the lighting device 30*a* from a luminance distribution L of the captured image of FIG. 8 acquired as the reference image and acquires the luminance from the illuminated area. In this case, the reference illuminance acquired by the reference illuminance acquiring unit 253 is preferably acquired from the inside of the area illuminated by the lighting device 30*a*.

When the illuminance estimation model generating unit 254 generates the illuminance estimation model 131 for the illuminated area of each of the lighting devices 30*a* to 30*f*, the illuminance estimation model setting unit 255 sets the illuminance estimation model 131 in the image sensor 10 by transmitting the generated illuminance estimation model 131 to the image sensor 10 together with information indicating the disposition position (illuminated area) to which this illuminance estimation model 131 is applied and storing the illuminance estimation model 131 in the storage unit 13. The illuminance estimation unit 141 of the image sensor 10 acquires the illuminance of each illuminated area included in the captured image photographed by the subject device and estimates the illuminance of each illuminated area using the illuminance estimation model 131 corresponding to the illuminated area.

As described above, at least one captured image (reference image) is necessary in order to generate the illuminance estimation model 131. However, when a change occurs in the area (space) imaged by the image sensor 10, for example, when the layout of an office is changed, the imaging result obtained from the image sensor 10 is different from the previous imaging result. Therefore, a new reference image is preferably acquired and the illuminance estimation model 131 is preferably generated again.

Accordingly, the reference image acquiring unit 252 of the illuminance estimation model generation device 20 retains the previously acquired reference image for each image sensor 10 and acquires a new captured image from each image sensor 10 at a predetermined timing (for example, the same clock as the clock at which the previous reference image is acquired). When a change in the layout is detected from a difference between both images, the illuminance estimation model 131 of the image sensor 10 may be automatically updated by acquiring the new captured image as the reference image again. In this case, the previous illuminance value may be used as the illuminance value or a new illuminance value may be acquired. Further, a method of detecting the change in the layout is not particularly limited. For example, the edge of an object included in an image may be detected according to a known technology and the change in the layout may be detected depending on whether a difference between the edge positions in both images is equal to or greater than a predetermined threshold value.

In order to acquire the reference image, a static state in which no moving body such as people is not present in an area (space) to be imaged is preferable. Accordingly, the reference image acquiring unit 252 of the illuminance estimation model generation device 20 may acquire the captured image photographed in a period in which people are not present as the reference image based on the sensing result output by the image sensor 10. Further, when a time (for example, early morning, nighttime, or the like) in which people are absent preliminarily is determined, the reference image acquiring unit 252 and the reference illuminance acquiring unit 253 may automatically acquire the reference image and the illuminance at this time in cooperation with a timer device or the like.

[Second Embodiment]

Next, a second embodiment will be described. In the second embodiment, a configuration will be described in which various functions are added to the image sensor 10 described in the first embodiment to improve the illuminance detection function. The same reference numerals are given to the same configuration as the configuration described above in the first embodiment, and the description thereof will not be repeated.

Figure 9:
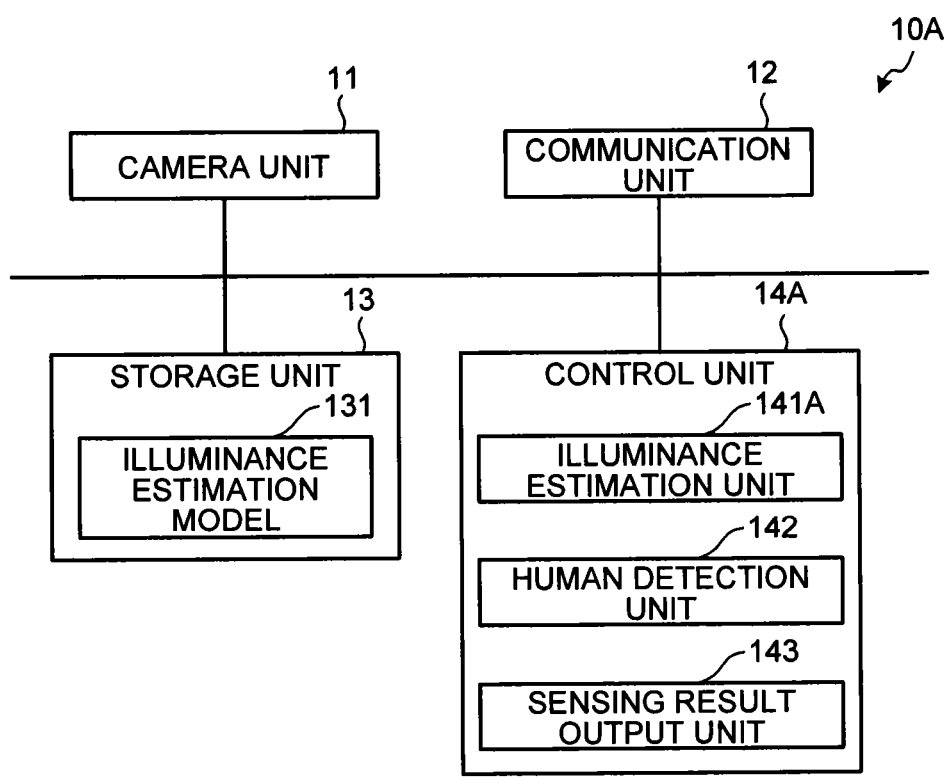
FIG. 9 is a diagram schematically illustrating the configuration of an image sensor according to a second embodiment.

FIG. 9 is a diagram schematically illustrating the configuration of an image sensor 10A according to the second embodiment. As illustrated in the drawing, the image sensor 10A includes a camera unit 11, a communication unit 12, a storage unit 13, and a control unit 14A.

The control unit 14A has a computer configuration of a CPU, a ROM, a RAM, and the like (none of which are illustrated) and generally controls a process of the image sensor 10A in cooperation with a program stored in the ROM or the storage unit 13. Further, the control unit 14A includes an illuminance estimation unit 141A, a human detection unit 142, and a sensing result output unit 143 as functional units in cooperation with a program stored in the ROM or the storage unit 13.

The illuminance estimation unit 141A has the same function as the above-described illuminance estimation unit 141. Further, the illuminance estimation unit 141A removes an illuminance estimation deterioration factor included in the captured image used in the illuminance estimation from the captured image and acquires luminance from the captured image from which the deterioration factor is removed.

Here, examples of the illuminance estimation deterioration factor include a moving body and a local light source such as a lighting lamp on a desk. For example, the illuminance estimation unit 141A specifies an area of a captured image in which people are detected by the human detection unit 142 as the illuminance estimation deterioration factor. When the local light source included in the captured image is removed, the illuminance estimation unit 141A specifies an area in which an object such as a desk or a light is present from the captured image as the illuminance estimation deterioration factor, for example, specifying the area in which the local light source is present as the illuminance estimation deterioration factor from the luminance distribution of the captured image or using an image recognizing technology. As another method, the illuminance estimation unit 141A stores the captured images (or the detection result of the human detection unit 142) corresponding to a predetermined period (for example, for one week) in the storage unit 13 or the like and specifies an area in which people or a local light source is frequently detected as the illuminance estimation deterioration factor based on such information. Then, the illuminance estimation unit 141A removes the deterioration factor by excluding the area specified as the illuminance estimation deterioration factor from a luminance acquisition target area.

When the entire captured image or the luminance acquisition target area is full of the deterioration factor, the luminance may be acquired from temporally continuous previous or subsequent captured images or acquisition of the luminance may be suppressed.

The illuminance estimation unit 141A sets a static area, in which a change such as entrance or exit of people or movement of an object is small, as the luminance acquisition target region in order to ensure accuracy of the luminance acquired from the captured image. For example, the illuminance estimation unit 141A specifies a static area such as a wall or floor surface in which entrance or exit of people or movement of an object is small by detecting an edge from the captured image and extracting a boundary with a wall, a floor, or a ceiling of a building. As another method, a static area included in the captured image, such as a wall or floor surface in which entrance or exit of people or movement of an object is small, is specified based on the captured images obtained by imaging general office spaces by performing a learning of the layout of an office, the shapes of various objects, or the like based on the captured images obtained by imaging general office spaces to generate an object discrimination model and using the object discrimination model. Further, the captured images (or the detection result of the human detection unit 142) corresponding to a predetermined period (for example, for one week) may be stored in the storage unit 13 or the like and the static area in which entrance or exit of people or movement of an object is small may be specified based on such information on the captured images. Then, the illuminance estimation unit 141A sets the static area specified from the captured image as the luminance acquisition target area.

The luminance is acquired from the captured image by a pixel level, as in the image sensor 10. However, an average value or the like of the luminances of the pixels constituting the luminance acquisition target area may be acquired as the luminance of the captured image. Further, an average value of the luminances of arbitrary areas in the luminance acquisition target area may be acquired as the luminance of the captured image. Furthermore, the luminance may be acquired for each of the pixels constituting the luminance acquisition target area or each of a plurality of division areas divided from the captured image. In this case, the illuminance is preferably derived for each pixel or each division area by using the illuminance estimation model 131 prepared for each pixel or each division area. Further, an average value or the like of the derived luminances may be derived as an estimation result.

The illuminance estimation unit 141A acquires the luminance from an area set as the luminance acquisition target area after removing the deterioration factor from the captured image, and then derives the illuminance corresponding to the luminance based on the illuminance estimation model 131.

Figure 10:
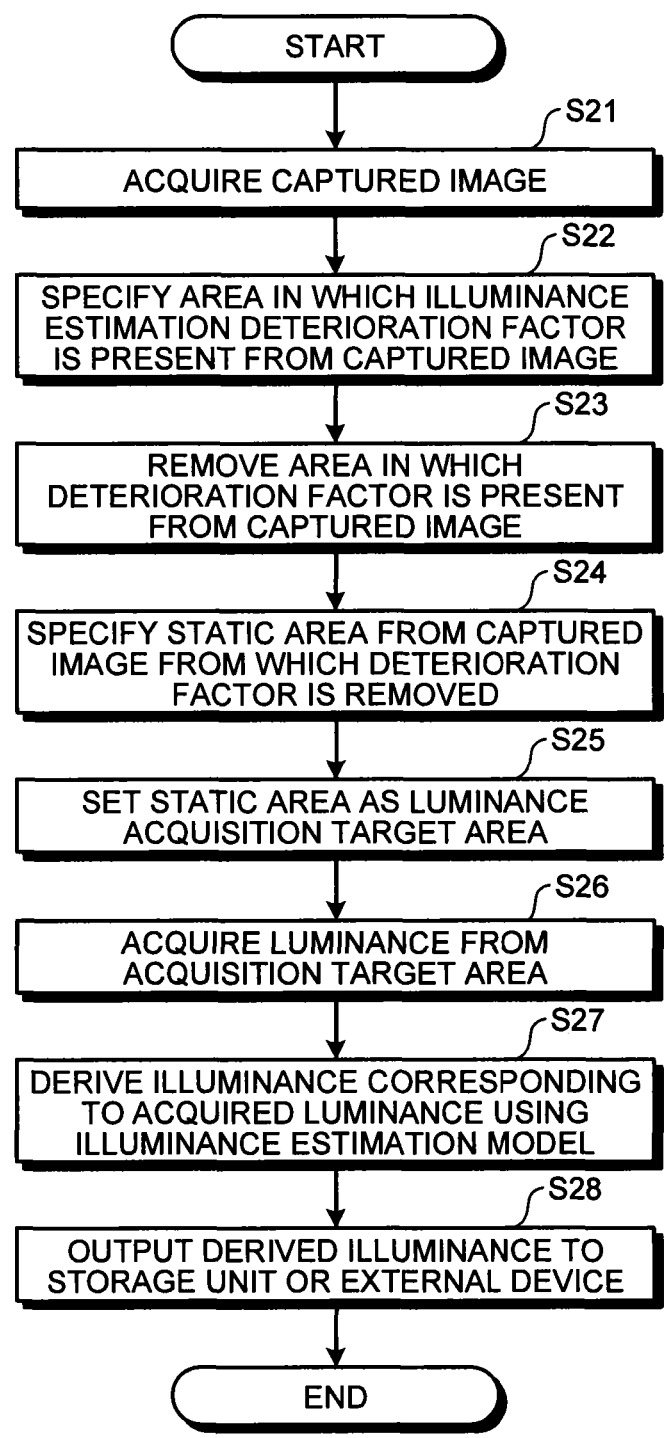
FIG. 10 is a flowchart illustrating an example of the order of an illuminance estimation process according to the second embodiment.

Hereinafter, a process relevant to the illuminance estimation in the image sensor 10A will be described. FIG. 10 is a flowchart illustrating an example of an illuminance estimation process performed by the image sensor 10A.

First, the captured image is acquired by causing the camera unit 11 to image an area which is a subject (step S21). Subsequently, when the illuminance estimation unit 141A specifies an area in which the illuminance estimation deterioration factor is present from the captured image (step S22), the illuminance estimation unit 141A removes the area in which the deterioration factor is present from the captured image (step S23). Next, when the illuminance estimation unit 141A specifies a static area in which entrance or exit of people or movement of an object is small from the captured image from which the deterioration factor is removed (step S24), the illuminance estimation unit 141A sets the specified static area as the luminance acquisition target area (step S25).

When the illuminance estimation unit 141A acquires the luminance from the luminance acquisition target area set in step S25 in the captured image (step S26), the illuminance estimation unit 141A derives the illuminance corresponding to the luminance using the illuminance estimation model 131 (step S27). Then, the sensing result output unit 143 outputs the illuminance derived in step S27 to the storage unit 13 or an external device (step S28), and then the process ends.

According to this embodiment, as described above, the illuminance is estimated from the luminance of the captured image using the illuminance estimation model 131 generated by the basic models 241. Therefore, the illuminance estimation can be performed with high accuracy. Further, since the area in which the deterioration factor is present can be automatically removed or the acquisition target area (static area) can be automatically set, convenience relevant to adjustment of the image sensor 10A can be improved. Further, since the illuminance estimation is performed using the captured image from which the illuminance estimation deterioration factor is removed, the illuminance estimation can be performed with higher accuracy. Furthermore, since the illuminance estimation is performed using the luminance of the static area in the captured image, the illuminance estimation can be performed with higher accuracy.

The above-described second embodiment has been suggested as an example, and thus the scope of the invention is not intended as limiting. The above-described second embodiment may be achieved in various other ways, and omissions, substitutions, changes, additions, or the like may be variously made within the scope of the invention without departing from the gist of the invention. Further, the above-described embodiment or the modifications are included in the scope or the gist of the invention and are included in the equivalent scope of the invention described in the claims.

For example, in the second embodiment, both processes of removing the illuminance estimation deterioration factor and specifying the static area have been performed, but the invention is not limited thereto. One of these processes may be configured to be performed.

[Third Embodiment]

Next, a third embodiment will be described. In the third embodiment, an image sensor system using the image sensor 10 (or the image sensor 10A) described above will be described. Further, an example will be described in which the image sensor system is applied to a lighting control system in a building such as the office building illustrated in FIG. 2, but the application scope is not limited thereto. The same reference numerals are given to the same constituent elements as those of the first embodiment, and the description thereof will not be repeated.

Figure 11:
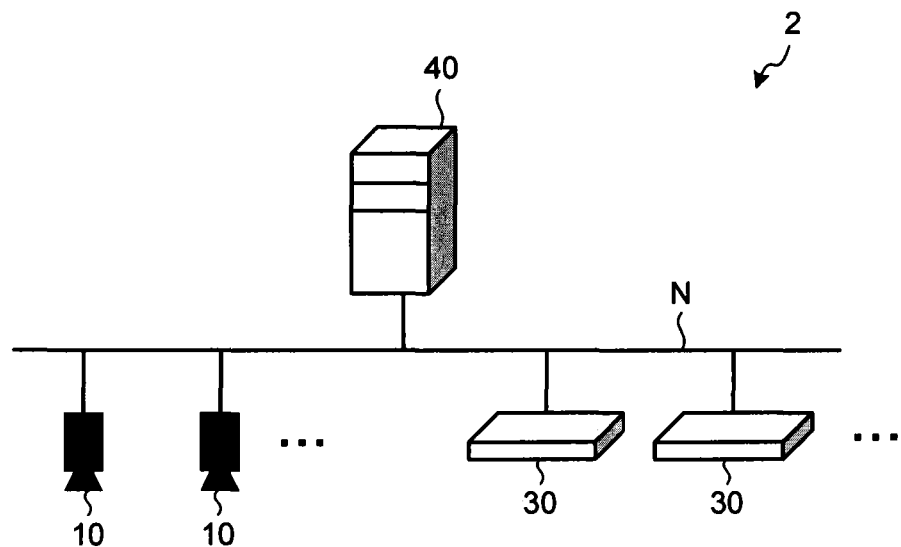
FIG. 11 is a diagram illustrating an example of the configuration of an image sensor system according to a third embodiment.

FIG. 11 is a diagram illustrating an example of the configuration of an image sensor system 2 according to the third embodiment. As illustrated in the drawing, the image sensor system 2 includes image sensors 10, lighting devices 30, and a lighting control device 40. Here, the image sensors 10 and the lighting control device 40 are detachably connected to a line N, and thus communicate with each other via the line N. Since the each lighting device 30 is detachably connected to the line N, the lighting control device 40 controls ON/OFF of power, output values, or the like of the lighting devices 30. The number of image sensors 10 and the number of lighting devices 30 connected to the line N are not particularly limited. In FIG. 11, the line to which the image sensors 10 are connected and the line to which the lighting devices 30 are connected are the same, but may be different lines.

The image sensor 10 retains the illuminance estimation model 131 described in the first embodiment in the storage unit 13. The image sensor 10 estimates the illuminance of the periphery of the subject device from the luminance of a captured image photographed by the camera unit 11 based on the illuminance estimation model 131. The image sensor 10 detects presence/absence or the like of people within an area which is a subject by analyzing the captured image. The image sensor 10 outputs the estimated illuminance and the detection result of the presence/absence or the like of people as the sensing result to an external device (the lighting control device 40) via the communication unit 12. The image sensor 10 transmits a sensor identifier used to identify the subject image sensor together when communicating with the lighting control device 40.

The lighting device 30 is a lighting device such as a fluorescent lamp or an LED (Light Emitting Diode) and illuminates a space in which the subject lighting device is installed. The lighting device 30 switches ON/OFF or output values of lighting under the control of the lighting control device 40.

The image sensors 10 and the lighting devices 30 are installed on a ceiling of an office, as in FIG. 2.

The lighting control device 40 is a server device that controls the lighting devices 30 based on the sensing result input from each of the image sensors 10. Hereinafter, the configuration of the lighting control device 40 will be described.

Figure 12:
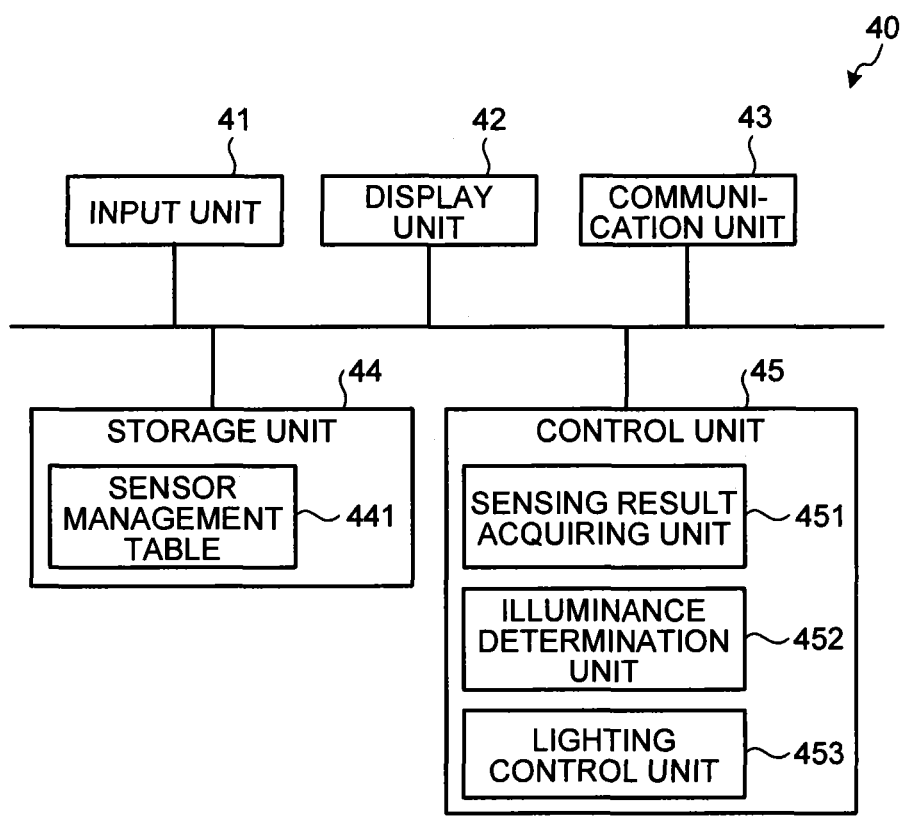
FIG. 12 is a diagram schematically illustrating an example of the configuration of a lighting control device illustrated in FIG. 11.

FIG. 12 is a diagram schematically illustrating an example of the configuration of the lighting control device 40. As illustrated in the drawing, the lighting control device 40 includes an input unit 41, a display unit 42, a communication unit 43, a storage unit 44, and a control unit 45.

The input unit 41 includes an input device such as a keyboard or a pointing device and outputs operation contents received from an operator of the lighting control device 40 to the control unit 45. The display unit 42 includes a display device such as a liquid crystal display panel and displays various kinds of information in response to an instruction from the control unit 45. The communication unit 43 is a communication interface which is detachably connected to the line N, and transmits and receives various kinds of information to and from an external device (the image sensor 10, the lighting device 30, or the like) via the line N.

The storage unit 44 is an auxiliary storage device such as an HDD and stores various programs or setting information executed by the control unit 45. The storage unit 44 stores a sensor management table 441 as the setting information relevant to the control on the lighting device 30.

The sensor management table 441 is a data table in which the image sensors 10 correspond to the lighting devices 30 supervised under the corresponding image sensors 10. Here, the supervision of the image sensor 10 means that a target is controlled according to the sensing result of the image sensor 10. For example, the target is the lighting device 30 placed at the position corresponding to an imaging range of the image sensor 10 or the lighting device 30 or the like installed in the same indoor as that of the image sensor 10.

FIG. 13 is a diagram illustrating an example of the data structure of the sensor management table 441. As illustrated in the drawing, the sensor management table 441 has a sensor identifier and a lighting identifier as data entries, the data entries are managed in correspondence therewith.

Here, the sensor identifier is identification information used to identify each image sensor 10. Examples of the sensor identifier include an IP address, a MAC address, and a manufacturing number assigned in advance to each image sensor 10. The lighting identifier is identifier information used to identify each lighting device 30. Examples of the lighting identifier include an IP address, a MAC address, and a manufacturing number assigned in advance to each lighting device 30.

In FIG. 13, for example, "sensor 01" and "sensor 02" are registered as the sensor identifiers. Further, for example, three lighting identifiers "lighting 01" to "lighting 03" are registered in correspondence with the sensor identifier "sensor 01" and three lighting identifiers "lighting 04" to "lighting 06" are registered in correspondence with the sensor identifier "sensor 02."

The control unit 45 has a computer configuration of a CPU, a ROM, a RAM, and the like (none of which are illustrated) and generally controls a process of the lighting control device 40 in cooperation with a program stored in the ROM or the storage unit 44. Further, the control unit 45 includes a sensing result acquiring unit 451, an illuminance determination unit 452, and a lighting control unit 453 as functional units in cooperation with a program stored in the ROM or the storage unit 44.

The sensing result acquiring unit 451 acquires a sensing result from each of the image sensors 10 of which the sensor identifiers are registered in the sensor management table 441. Here, the sensing result includes a detection result of the illuminance, presence/absence of people, or the like.

The illuminance determination unit 452 determines illuminance of the periphery of the image sensor 10 or illuminance of the entire room in which the image sensor 10 is installed based on the illuminance included in the sensing result of each image sensor 10 acquired by the sensing result acquiring unit 451, and then outputs the determination result together with the sensor identifier of the corresponding image sensor 10 to the lighting control unit 453.

For example, when the sensing result of one image sensor 10 includes one illuminance, the illuminance determination unit 452 determines this illuminance as the illuminance of the periphery of this image sensor 10. Further, when the sensing result of one image sensor 10 includes illuminance matching the disposition position, the illuminance determination unit 452 determines this illuminance as the illuminance at each disposition position of the periphery of the image sensor 10.

When the plurality of image sensors 10 are installed in the same room, the illuminance determination unit 452 may calculate an average value or the like of the illuminances included in the sensing results of the image sensors 10 and determines the illuminance obtained through this calculation as the illuminance of the entire room in which the image sensors 10 are installed. Further, the determination on the image sensors 10 installed in the same room is performed based on layout information indicating the disposition positions or a positional relation of the image sensors 10 or the lighting devices 30 in each room or setting information (none of which are illustrated) in which the sensor identifiers of the image sensors 10 installed in the same room are matched.

The illuminance determination unit 452 may output a value obtained by dividing the determined illuminance step by step (level) according to the degree of illuminance to the lighting control unit 453.

The lighting control unit 453 controls ON/OFF or an output value of each lighting device 30 based on the illuminance input from the illuminance determination unit 452 and the detection result of presence/absence of people or the like included in the sensing result.

For example, the lighting control unit 453 performs control such that the lighting control unit 453 lowers the output (light modulation ratio) of the lighting device 30 in a room (area) in which illuminance necessary for office work is ensured or raises the output (light modulation ratio) of the lighting device 30 in a room (area) in which illuminance necessary for office work is not ensured. Further, lighting control unit 453 performs controls such that the lighting control unit 453 turns on the lighting device 30 in a room (area) in which people are present, turns off the lighting device 30 in a room (area) in which people are not present, and changes the light modulation ratio of the lighting device 30 according to a distribution of people.

The lighting identifier of a control target lighting device 30 is selected from the sensor management table 441 based on the sensor identifier input together with the illuminance from the illuminance determination unit 452 and the sensor identifier transmitted together with the sensing result from the image sensor 10. When the illuminance determination unit 452 determines the illuminance for each a predetermined disposition position of the periphery of the image sensor 10, the lighting device 30 corresponding to the disposition position may be individually controlled based on the illuminance.

A correspondence relation between the disposition position and the lighting device 30 (lighting identifier) is used to specify the corresponding lighting device 30 based on the above-described layout information or the like.

Hereinafter, a process relevant to the lighting control performed by the lighting control device 40 will be described. FIG. 14 is a flowchart illustrating an example of a lighting control process performed by the lighting control device 40.

First, the sensing result acquiring unit 451 acquires the sensing result from each of the image sensors 10 of which the sensor identifiers are registered in the sensor management table 441 (step S31). Here, an acquisition timing of the sensing result is not particularly limited. The sensing results may be configured to be acquired together from the respective image sensors 10 or may be configured to be acquired at different timings. Further, the sensing result acquiring unit 451 may be configured to request the image sensor 10 to transmit the sensing result, or the sensing result transmitted from the image sensor 10 may be configured to be waited.

Subsequently, the illuminance determination unit 452 determines the illuminance of the periphery of the image sensor 10 transmitting the sensing result or the illuminance of the entire room in which this image sensor 10 is installed based on the illuminance included in the sensing result acquired in step S31 (step S32).

Then, when the lighting identifier corresponding to the sensor identifier of the image sensor 10 to be determined by the illuminance determination unit 452 is specified from the sensor management table 441 (step S33), the lighting control unit 453 modulates (controls) light of the lighting device 30 corresponding to this lighting identifier based on the determination result of step S32 on this image sensor 10 or the detection result of the presence/absence or the like of people included in the sensing result (step S34), and then the process ends. This process is performed whenever the sensing result acquiring unit 451 acquires the sensing result.

Thus, according to this embodiment, since the illuminance is estimated from the luminance of the captured image using the illuminance estimation model 131 generated from the basic models 241, the illuminance estimation can be performed with high accuracy. Further, since the lighting device 30 is controlled using the sensing result of the image sensor 10, the lighting device 30 can be controlled more reliably.

Hereinbefore, the third embodiment has been described, but this embodiment has been suggested as an example, and thus the scope of the invention is not intended as limiting. The above-described embodiment may be achieved in various other ways, and omissions, substitutions, changes, additions, or the like may be variously made within the scope of the invention without departing from the gist of the invention. Further, the above-described embodiment or the modifications are included in the scope or the gist of the invention and are included in the equivalent scope of the invention described in the claims.

For example, in the above-described third embodiment, the example has been described in which a building such as an office building is set as a management target, but the invention is not limited thereto. All of a plurality of buildings, outdoor facilities, areas, or the like may be set as management targets. In the above-described embodiment, the lighting device 30 is set as a control target, but the invention is not limited thereto. Other electric devices such as air-conditioning devices may be included as the control targets.

The program executed by each device according to the first to third embodiments described above is embedded in advance into a storage medium (the ROM or the storage unit) included in each device so as to be supplied, but the invention is not limited thereto. An installable or executable file may be recorded in a computer-readable recording medium such as a CD-ROM, a flexible disk (FD), a CD-R, or a DVD (Digital Versatile Disk) so as to be supplied. Further, the storage medium is not limited to a medium independent from a computer or an incorporated system, but an example of the storage medium may also include a storage medium that stores or temporarily stores a program delivered and downloaded via a LAN, the Internet, or the like.

Further, the program executed by each device according to the first to third embodiments described above may be stored on a computer connected to a network such as the Internet and downloaded via the network so as to be supplied. Alternatively, the program may be provided or distributed via a network such as the Internet.

1 ILLUMINANCE ESTIMATION MODEL SETTING SYSTEM
2 IMAGE SENSOR SYSTEM
10, 10A IMAGE SENSOR
11 CAMERA UNIT
12 COMMUNICATION UNIT
13 STORAGE UNIT
131 ILLUMINANCE ESTIMATION MODEL
14, 14A CONTROL UNIT
141, 141A ILLUMINANCE ESTIMATION UNIT
142 HUMAN DETECTION UNIT
143 SENSING RESULT OUTPUT UNIT
20 ILLUMINANCE ESTIMATION MODEL GENERATION DEVICE
21 INPUT UNIT
22 DISPLAY UNIT
23 COMMUNICATION UNIT
24 STORAGE UNIT
241 BASIC MODEL
25 CONTROL UNIT
251 BASIC MODEL GENERATING UNIT
252 REFERENCE IMAGE ACQUIRING UNIT
253 REFERENCE ILLUMINANCE ACQUIRING UNIT
254 ILLUMINANCE ESTIMATION MODEL GENERATING UNIT
255 ILLUMINANCE ESTIMATION MODEL SETTING UNIT
30 LIGHTING DEVICE
40 LIGHTING CONTROL DEVICE
41 INPUT UNIT
42 DISPLAY UNIT
43 COMMUNICATION UNIT
44 STORAGE UNIT
441 SENSOR MANAGEMENT TABLE
45 CONTROL UNIT
451 SENSING RESULT ACQUIRING UNIT
452 ILLUMINANCE DETERMINATION UNIT
453 LIGHTING CONTROL UNIT
N LINE

The invention claimed is:

1. An illuminance estimation model generation device comprising:
a memory that stores a basic model indicating a plurality of relations for a plurality of subject conditions between a plurality of illuminances and a plurality of luminance of a plurality of captured images, which are obtained when a subject is imaged by changing an illuminance condition under the subject conditions;
a processor configured to:
acquire a captured image captured in a target space for illuminance estimation as a reference image;
acquire illuminance of the target space at a time of imaging the reference image as reference illuminance;
generate an illuminance estimation model indicating a relation between illuminance and luminance in the target space from a data value indicated as a pair of the reference illuminance and luminance of the reference image based on the basic model; and
compare the reference image which is previously acquired and an image newly captured in the target space to newly acquire the newly captured image as the reference image, when a difference between the previously acquired reference image and the newly captured image is greater than a predetermined threshold value.

2. The illuminance estimation model generation device according to claim 1, the processor further configured to:
generate the basic model,
wherein the memory stores the basic model generated by the processor.

3. The illuminance estimation model generation device according to claim 2, wherein the processor is further configured to calculate a plurality of regression expressions of the plurality of illuminances and the luminance of the captured images for the subject conditions to generate the regression expressions as the basic model.

4. The illuminance estimation model generation device according to claim 1,
wherein the processor is further configured to generate the illuminance estimation model by performing linear interpolation on the data value indicated as the pair of the reference illuminance and the luminance of the reference image using the basic model.

5. The illuminance estimation model generation device according to claim 1,
wherein the processor is further configured to acquire the luminance from one or a plurality of areas included in the reference image to generate the illuminance estimation model for each of the areas.

6. The illuminance estimation model generation device according to claim 5, wherein the processor is further configured to specify an area illuminated by a lighting device provided in the target space from the reference image to generate the illuminance estimation model based on luminance acquired from the specified area.

7. An image sensor device comprising:
a memory that stores an illuminance estimation model generated by an information processor;
a processor configured to:
acquire a captured image captured in a target space for illuminance estimation; and
derive illuminance corresponding to luminance of the captured image based on the illuminance estimation model,
wherein the information processor comprising:
a specific memory that stores a basic model indicating a plurality of relations for a plurality of subject conditions between a plurality of illuminances and a plurality of luminance of a plurality of captured images, which are obtained when a subject is imaged by changing an illuminance condition under the subject conditions;
the information processing configured to:
acquire a captured image captured in the target space for illuminance estimation as a reference image;
acquire illuminance of the target space at a time of imaging the reference image as reference illuminance; and generate an illuminance estimation model indicating a relation between illuminance and luminance in the target space from a data value indicated as a pair of the reference illuminance and luminance of the reference image based on the basic model, wherein the memory stores the illuminance estimation model in correspondence with a predetermined area in the captured image, and the processor is further configured to acquire luminance from each area in the captured image which corresponds to the illuminance estimation model to derive illuminance using the illuminance estimation model corresponding to the each area.

8. The image sensor device according to claim 7, wherein the processor is further configured to exclude an area in which a moving body or a local light source is present from the captured image to acquire the luminance from the captured image from which the area is removed.

9. The image sensor device according to claim 7, wherein the processor is further configured to specify a static area in which a change is small from the captured images to acquire the luminance from the static area.

10. The image sensor device according to claim 7, further comprising:

an output that outputs the illuminance derived by the processor or a value according to a degree of the illuminance.

11. A non-transitory computer readable medium including computer programmed instructions, wherein the instructions, when executed by a computer, cause the computer to perform:

retaining a basic model indicating a plurality of relations for a plurality of subject conditions between a plurality of illuminances and a plurality of luminance of a plurality of captured images, which are obtained when a subject is imaged by changing an illuminance conditions under the subject conditions;

acquiring illuminance of the target space at a time of imaging the reference image as reference illuminance;

acquiring illuminance of the target space at a time of imaging the reference image as reference illuminance; and generating an illuminance estimation model indicating a relation between illuminance and luminance in the target space from a data value indicated as a pair of the reference illuminance and luminance of the reference image based on the basic model.

* * * * *